(12) United States Patent
Russell et al.

(10) Patent No.: US 9,878,296 B2
(45) Date of Patent: Jan. 30, 2018

(54) STABILIZING LIQUID DROPS OF ARBITRARY SHAPE BY THE INTERFACIAL JAMMING OF NANOPARTICLES

(71) Applicant: The University of Massachusetts, Boston, MA (US)

(72) Inventors: Thomas P. Russell, Amherst, MA (US); Mengmeng Cui, Amherst, MA (US); Todd Emrick, Amherst, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 467 days.

(21) Appl. No.: 14/509,609

(22) Filed: Oct. 8, 2014

(65) Prior Publication Data

US 2015/0102265 A1   Apr. 16, 2015

Related U.S. Application Data

(60) Provisional application No. 61/889,713, filed on Oct. 11, 2013.

(51) Int. Cl.
| | |
|---|---|
| *A61K 9/51* | (2006.01) |
| *B82Y 30/00* | (2011.01) |
| *B82Y 40/00* | (2011.01) |
| *B01F 17/00* | (2006.01) |
| *B01F 17/54* | (2006.01) |

(52) U.S. Cl.
CPC ...... *B01F 17/0028* (2013.01); *B01F 17/0007* (2013.01); *B01F 17/0071* (2013.01)

(58) Field of Classification Search
CPC . A61K 9/51; B82Y 30/00; B82Y 5/00; B82Y 40/00; B01J 13/00
See application file for complete search history.

(56) References Cited

U.S. PATENT DOCUMENTS

| | | | | |
|---|---|---|---|---|
| 8,202,614 B2 * | 6/2012 | Koene | ...................... | B05D 5/08 |
| | | | | 106/287.28 |
| 2004/0202682 A1 * | 10/2004 | Emrick | ................ | A61K 9/5089 |
| | | | | 424/400 |
| 2015/0105347 A1 * | 4/2015 | Spicer | ................ | C11D 17/0017 |
| | | | | 514/63 |

FOREIGN PATENT DOCUMENTS

CN       101481444 B   * 12/2010

OTHER PUBLICATIONS

CN 101481444 Machine Translation.*
Three-Dimensional Real-Time Tracking of Nanoparticles at an Oil-Water Interface, Du et al., Langmuir 2012, 28, 9181-9188.*
(Continued)

*Primary Examiner* — Khanh Tuan Nguyen
*Assistant Examiner* — Haidung Nguyen
(74) *Attorney, Agent, or Firm* — Cantor Colburn LLP

(57) ABSTRACT

A stabilized assembly including a first liquid phase of non-spherical droplets in a second liquid phase, wherein the second liquid phase is immiscible with the first phase, and nanoparticle surfactants assembled at an interface of the non-spherical droplets and the second phase is disclosed. The nanoparticle surfactants include nanoparticles and end-functionalized polymers that can interact through ligand type interactions, and the first phase is stabilized by a disordered, jammed layer of nanoparticle surfactants. A method of preparing a stabilized assembly is also disclosed.

20 Claims, 2 Drawing Sheets

(56) References Cited

OTHER PUBLICATIONS

Brown, E. et al., "Universal Robotic Gripper Based on the Jamming of Granular Material", (2010), vol. 107, 44, pp. 18809-18814.

Cates, M. et al., "Bijels: A New Class of Soft Materials", (2008), Soft Matter, 4, pp. 2132-2138.

Cui, M. et al., "Stabilizing Liquid Drops in Nonequilibrium Shapes by the Interfacial Jamming of Nanoparticles", (2013) Science 342, pp. 460-463 & Supp. Materials, (2013); 11 pp. total.

Dinsmore, A. D. et al., "Colloidosomes: Selectively Permeable Capsules Composed of Colloidal Particles", (2002), Science 298, pp. 1006-1009.

Feng, J. et al., "A Computational Analysis of Electrohydrodynamics of a Leaky Dielectric Drop in an Electric Field", (1995), J. Fluid Mech., vol. 311, pp. 289-326.

Ha, J. W. et al., "Deformation and Breakup of Newtonian and Non-Newtonian Conducting Drops in an Electric Field", (1999), J. Fluid Mech., vol. 405, pp. 131-156.

Herzig, E. M. et al., "Bicontinuous Emulsions Stabilized Solely by Colloidal Particles", (2007), Nature Materials, vol. 6, pp. 966-971.

Lin, Y. et al., "Nanoparticle Assembly and Transport at Liquid-Liquid Interfaces", (2003), Science, 299, pp. 226-229.

Pawar, A. et al., "Arrested Coalescence in Pickering Emulsions", (2011), The Royal Society of Chemistry, Soft Matter, 7, 7710, pp. 7710-7716.

Saville, D., "Electrohydrodynamics: The Taylor-Melcher Leaky Dielectric Model", (1997), J. Fluid Mech., 29, pp. 27-64.

Stone, H. A. et al., "Drops with Conical Ends in Electric and Magnetic Fields", (1999), Proceedings: Mathematical, Physical and Engineering Sciences, vol. 455, No. 1981, pp. 329-347.

Stratford, K. et al., "Colloidal Jamming at Interfaces: A Route to Fluid-Bicontinuous Gels", (2005), Science 309, pp. 2198-2201.

Subramaniam, A. et al., "Mechanics of Interfacial Composite Materials", (2006), Langmuir, 22, pp. 10204-10208.

Subramaniam, A. et al., "Non-Spherical Bubbles", (2005), Nature, vol. 438, p. 930.

Taylor, G., "Disintegration of Water Drops in an Electric Field", (1964), Proceedings of the Royal Society of London, Series A, Mathematical and Physical Sciences, vol. 280, 1382, pp. 383-397.

Vizika, O. et al., "The Electrohydrodynamic Deformation of Drops Suspended in Liquids in Steady and Oscillatory Electric Fields", (1991), J. Fluid Mech., vol. 239, pp. 1-21.

Zhang, J. et al., "One-Step Fabrication of Supramolecular Microcapsules from Microfluidic Droplets", (2012), Science 335, pp. 690-694.

\* cited by examiner

STABILIZING LIQUID DROPS OF ARBITRARY SHAPE BY THE INTERFACIAL JAMMING OF NANOPARTICLES

CROSS REFERENCE TO RELATED APPLICATIONS

This application claims priority benefit of U.S. Provisional Patent Application No. 61/889,713 filed Oct. 11, 2013, the entirety of which is incorporated herein by reference.

STATEMENT REGARDING FEDERALLY SPONSORED RESEARCH & DEVELOPMENT

This invention was made with government support under Grant Number DE-FG02-04ER46126 from the Department of Energy Office of Basic Energy Science. The government has certain rights in the invention.

BACKGROUND OF THE INVENTION

The jamming of colloidal particles at interfaces has been disclosed for the fusion and coalescence of liquid drops, and the generation of "bijels", pointing to the importance of jamming to freeze-in, or solidify, otherwise liquid structures. See, e.g., A. B. Subramaniam, M. Abkarian, L. Mahadevan, H. A. Stone, Nature, 438, 930 (2005); A. B. Subramaniam, M. Abkarian, L. Mahadevan, H. A. Stone, Langmuir, 22, 10204 (2006); A. B. Pawar, M. Caggioni, R. Ergun, R. W. Hartel, P. T. Spicer, Soft Matter, 7, 7710 (2011); K. Stratford, R. Adhikari, I. Pagonabarraga, J. C. Desplat, M. E. Cates, Science, 309, 2198 (2005); E. M. Herzig, K. A. White, A. B. Schofiel, W. C. K. Poon, and P. S. Clegg, Nature Materials, 6, 966 (2007); M. E. Cates, P. S. Clegg, Soft Matter, 4, 2132 (2008); A. D. Dinsmore, M. F. Hsu, M. G. Nikolaides, M. Marquez, A. R. Bausch, D. A. Weitz, Science, 298, 1006 (2002); Y. Lin, H. Skaff, T. Emrick, A. D. Dinsmore, T. P. Russell, Science, 299, 226 (2003); J. Zhang, R. J. Coulston, S. T. Jones, J. Geng, O. A. Scherman, C. Abell, Science, 335, 690 (2012); E. Brown, N. Rodenberg, J. Amend, A. Mozeika, E. Steltz, M. R. Zakin, H. Lipson, H. M. Jaeger, PNAS, 107, 18809 (2010). Mahadevan and Stone disclosed fusing two fluid droplets between two planar surfaces, thereby generating an ellipsoidal drop in which interfacial jamming of colloidal particles arrested relaxation of the droplet prior to it reaching its equilibrium spherical shape. Clegg and Cates disclosed generating "bijels" in a water-lutidine system, wherein colloidal particles segregating to the interface of a mixture undergoing spinodal phase separation jammed, thereby freezing-in a bicontinuous morphology, possibly a new state of matter. Poon and coworkers disclosed arrested droplet coalescence when colloidal particles are jammed at an interface.

The wetting conditions necessary to assemble colloidal particles at the interface are demanding, consequently limiting the long-term stability of the assemblies thereof, and the unique fluid structures possible. The requirements for neutral wetting conditions are even more critical for nanoparticles, where the gain in the interfacial energy of each nanoparticle is close to thermal energies. Further, the use of colloidal particles limits the minimum size of the fluid domains achievable, consequently, only nanoparticles allow access to smaller size scales. Even if the demanding wetting criteria were to be met, prior disclosures did not address a means or method for creating and preserving a particular shape to the fluid domains.

Liquid-liquid assemblies have been the subject of intensive research and development. Nonetheless, there remains a continuing need for stabilized nanoparticle assemblies having arbitrary (non-equilibrium), yet controlled morphologies, and methods for the preparation of such assemblies.

SUMMARY OF THE INVENTION

The method of the present disclosure provides a means to arbitrarily control the shape of a liquid domain clad with a protective coating within another liquid. Such a method enables the design of liquid-liquid systems for the long-term storage of solutions in a support medium or alternatively in a reactive environment. The method further enables the generation of two-phased systems having arbitrary, yet controlled morphologies, and, still further, systems with significantly amplified interfacial area.

One embodiment is a stabilized assembly comprising a first liquid phase comprising non-spherical droplets dispersed in a second liquid phase, wherein the second liquid phase is immiscible with the first phase, and nanoparticle surfactants assembled at an interface of the non-spherical droplets and the second phase, wherein the nanoparticle surfactants comprise nanoparticles and end-functionalized polymers that can interact through ligand type interactions, and wherein the first liquid phase is stabilized by a disordered, jammed layer of nanoparticle surfactants.

Another embodiment is a method for preparing a stabilized assembly, the method comprising, suspending a first liquid phase in a second liquid phase, wherein the first phase and the second phase are immiscible, and wherein the first phase comprises nanoparticles, dissolving an end-functionalized polymer in the second phase, wherein the polymer and the nanoparticles can interact at an interface through ligand type interactions to form nanoparticle surfactants, applying an external deformation field, and releasing the external deformation field, wherein applying the deformation field increases the surface area of the first phase to create a new interface, wherein the nanoparticle surfactants form a disordered, jammed assembly at the new interface, wherein upon releasing the external deformation field the jammed assembly at the new interface traps the first phase in a deformed state, and wherein the deformed state has a shape that is non-spherical.

These and other embodiments are described in detail below.

BRIEF DESCRIPTION OF THE FIGURES

The following figures are exemplary embodiments.

Figure 1:
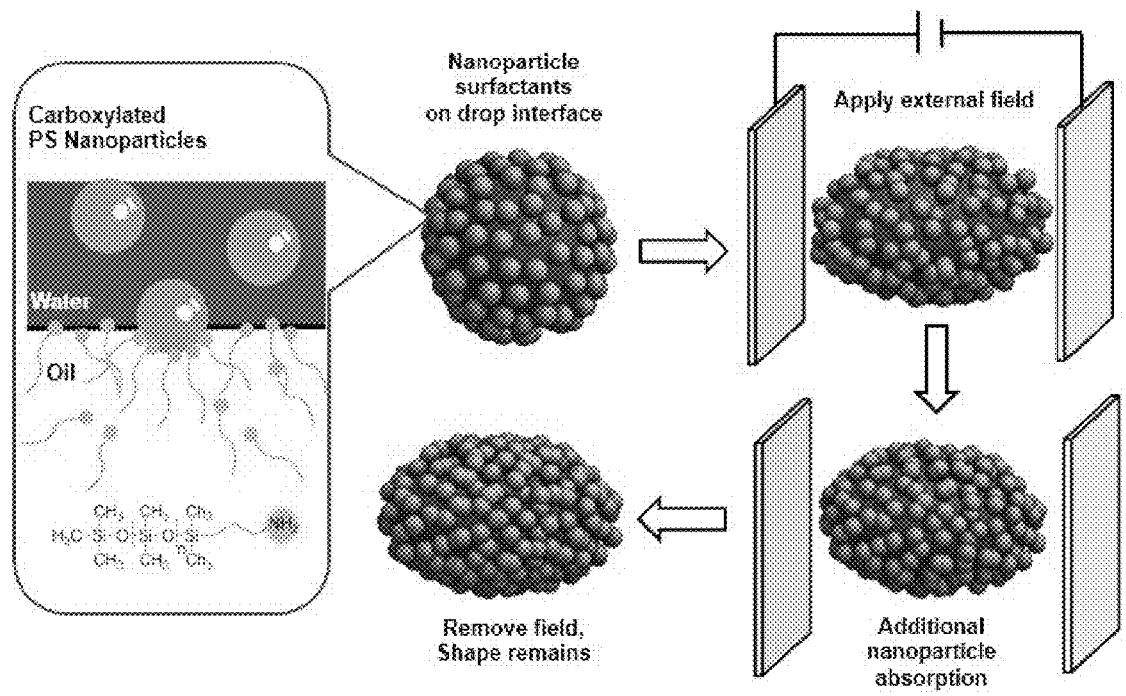
FIG. 1 shows a schematic representation of the deformation of a spherical drop, clad with nanoparticle surfactants, by an electric field, into an ellipsoid whose shape is maintained after the removal of the field by the interfacial jamming of the nanoparticle surfactants.

The foregoing will be apparent from the following more particular description of exemplary embodiments. The drawings are not necessarily to scale, emphasis instead being placed upon illustrating embodiments of the present invention.

DETAILED DESCRIPTION OF THE INVENTION

The disclosed method for facilitating interfacial jamming of nanoparticles at interfaces enables the design of liquid-liquid systems for the long-term storage of solutions in a support medium or reactive environment, the generation of two-phase systems having arbitrary, yet controlled morphologies, and systems with significantly amplified interfacial area. A two-phase system having an "arbitrary" morphology is meant to describe a system having a non-equilibrium shape. For example, a system having a spherical equilibrium shape can have an arbitrary morphology that is any non-spherical shape by the method of the present disclosure. These stabilized assemblies provide easy routes for encapsulation, bicontinuous flow or separations media, completely liquid microfluidic devices, delivery vehicles, and reaction platforms.

The present inventors have overcome the above-described limitations by a method which utilizes the interactions between ligands and/or functional groups on nanoparticles dispersed in one phase and end-functionalized polymer in a second phase, so as to form nanoparticle surfactants. The method disclosed herein can self-regulate the number of polymer chains that non-covalently attach to the nanoparticle by way of ligand type interactions, so that the reduction in the interfacial energy can be preferably maximized. Accordingly, the self-regulating nanoparticle surfactants disclosed herein are held at the interface of the two phases more strongly than nanoparticles not having increased surfactancy. Moreover, the assembly of the nanoparticle surfactants at the fluid-fluid interface is quite stable. Still further, the assembly of the nanoparticle surfactants is disordered (i.e., not forming an ordered layer at the interface like surfactants) and, consequently, the nanoparticle surfactants are mobile in the plane of the interface.

Stabilized assemblies represent one aspect of the present disclosure. The stabilized assemblies comprise nanoparticle surfactants at the interface of a first and a second phase. Each of the phases can be a liquid, and can further be any number of liquids generally known in the art provided that the liquids are immiscible. For example, the first and second phases can be aqueous and non-aqueous. A non-aqueous phase can be an organic phase. The organic phase can include, for example, organic solvents (e.g., toluene, ethyl acetate, methylene chloride, chloroform, carbon tetrachloride, dichloroethane, methyl ethyl ketone, and the like), oils (e.g., silicone oil, mineral oil, vegetable oils, and the like), hydrocarbons, fluorocarbons, waxes, and molten polymers. The organic phase can include materials which are solid at room temperature, provided that the system temperature can be adjusted such that the materials become liquid (i.e., in their molten form). In one embodiment, the first phase can be water, and the second phase can be silicone oil. In some embodiments, the first and second phases can form a planar interface. Alternatively, the first phase can be dispersed in the second phase. In some embodiments, when a first liquid phase is dispersed in a second liquid phase with which the first phase is immiscible, the first liquid phase can form spherical liquid droplets. A dispersed phase can represent less than 50 volume percent, for example, 0.01 to 50 volume percent, for example 0.1 to 25 volume percent, for example 1 to 10 volume percent, based on the total volume of the two phases. The amount of the dispersed phase can dictate the size and/or shape of the resulting assembly. Thus, the amount of the first and second phases can be selected according to the desired size and/or shape of the stabilized assembly.

A method for in situ generation of the nanoparticle surfactants is also described. For example, nanoparticles, generally particles having one or more dimensions on the order of 100 nanometers (nm) or less, that are dispersed in a water droplet (aqueous phase) which is further suspended in a non-aqueous phase (an oil) do not self-assemble at the interface between the aqueous and non-aqueous phases to reduce the interfacial energy, and therefore do not form a monolayer of nanoparticles at the oil-water interface that arrange or pack in a liquid-like manner. The decrease in the interfacial energy per nanoparticle that is necessary to form a monolayer of nanoparticles at the interface can be enhanced by dissolving an end-functionalized polymer in the non-aqueous phase that can interact with the nanoparticles in the aqueous phase, thereby preferably forming nanoparticle surfactants.

The nanoparticles can be metal, metal oxide, dielectric, semiconductor, inorganic, organic, hybrid structures and the like. For example, the nanoparticles can comprise an organic polymer, for example, polystyrene. The nanoparticles can be functionalized, for example, the nanoparticles can comprise one or more functional groups present on the surface of the nanoparticle. Exemplary functional groups can include carboxylate, amine, thiol, alcohol, and the like. For example, the nanoparticles can be carboxylated polystyrene nanoparticles. When the nanoparticle is, for example, a metal nanoparticle, the nanoparticle need not be functionalized as the interaction of various metals with specific functional groups is generally known. For example, a gold nanoparticle can interact with a thiol-functionalized polymer.

The nanoparticles can have one or more dimensions on the order of 100 nanometers (nm) or less. For example, the nanoparticles can have a diameter of 100 nm or less, specifically, 1 to 100 nm, more specifically, 5 to 50 nm, even more specifically, 5 to 25 nm.

The nanoparticles can be dispersed in the first liquid phase, and there is no particular limitation on the amount of nanoparticles present in the first phase. In some embodiments, the nanoparticles can be present in an amount of 0.1 to 20 weight percent, for example 0.1 to 10 weight percent, for example 0.5 to 5 weight percent, based on the weight of the first liquid phase. In a specific embodiment, the concentration of nanoparticles in the first phase can be 1 weight percent.

The end-functionalized polymer can be selected based on polymer solubility in the desired phase. For example, an oil-soluble polymer can be selected when it is preferable that the polymer is soluble in an oil phase. Conversely, a water-soluble polymer can be selected when it is preferable that the polymer is soluble in a water phase. The end-functionalized polymer can comprise a polymer having at least one functionalized chain end. For example, an end-functionalized polymer can include a mono-functionalized polymer, a di-functionalized polymer, or a multi-functionalized polymer, depending on the number of chain ends available for functionalization. The term "multi-functionalized polymer" is meant to include polymers having more than two functionalized chain ends.

The chemical structure of the end-functionalization can be selected by those skilled in the art with regards to the specific ligand type interactions and strength of those interactions with the selected nanoparticle. The scope of such selected polymers and their end-functionalized chemical structure is not limited in this regard by the present disclosure. The ligand type interaction can be any suitable bonding or non-bonding interaction. Ligand type interactions comprise high affinity or low affinity site-specific type interactions, non-bonded electrostatic interactions such as electropositive or electronegative type or van der Waals repulsive and attractive forces, ionic bonds, hydrogen bonds, coordination bonds, or a combination thereof.

The polymer end-functionalization can include, for example, amine, thiol, alcohol, carboxylate, and the like. For example, the end-functionalized polymer can be an amine-functionalized polymer. In an exemplary embodiment, the end-functionalized polymer can be an amine-functionalized polydimethylsiloxane, a bis(amine)-functionalized polydimethylsiloxane, or a combination comprising at least one of the foregoing.

The polymer can have a number average molecular weight ($M_n$) of 1,000 to 100,000 Daltons (Da), for example 1,000 to 20,000 Da, for example 1,000 to 10,000 Da, for example 2,000 to 5,000 Da. There is no particular limitation on the amount of polymer that can be present, with the proviso that the phase in which is it dissolved remains fluid. For example, the polymer can be present in an amount of 1 to 20 weight percent, for example, 1 to 10 weight percent, based on the total weight of the polymer and the second liquid phase in which the polymer is dissolved.

Depending on the ligand type interaction employed in preparing the nanoparticle surfactants, the interaction can be influenced by external stimuli including, for example, pH, temperature, electric fields, magnetic fields, and shear forces. For example, carboxylated nanoparticles and amine-functionalized polymers can form nanoparticle surfactants through ammonium-carboxylate interactions, the strength of which can be influenced by system pH. For example, at a pH of 5 to 7, specifically, 5.5 to 6.5, more specifically 6, the nanoparticle surfactant remains stable. At a pH of 1 to 3, specifically 1.5 to 2.5, more specifically 2, the nanoparticle surfactant can be decomposed into the respective carboxylated nanoparticle and amine-functionalized polymer.

The above-described system is not limited to nanoparticles that are dispersed in an aqueous phase, therefore the nanoparticles can alternatively be dispersed in a non-aqueous phase and the end-functionalized polymer can be dissolved in an aqueous phase. Furthermore, the system is not limited to an aqueous phase dispersed in an oil phase, therefore the first phase can alternatively be an oil phase dispersed in an aqueous phase.

Nanoparticle surfactants can form when a first liquid containing nanoparticles is suspended in a second liquid with which it is immiscible containing an end-functionalized polymer that can interact with the nanoparticles by way of ligand type interactions. Accordingly, the nanoparticle surfactants can reduce the interfacial energy. Further the nanoparticle surfactants can form so as to saturate the interface of the first liquid phase and the second liquid phase, and maximize the resultant reduction in interfacial energy, in which case the nanoparticle surfactants at the interface can form a disordered, jammed assembly, shown schematically in FIG. 1, top center. Interfacial particle "jamming" resulting in the jammed assemblies can refer to increasing the particle density at the interface so that the interface becomes rigid. Thus, the rigid interface can freeze-in a particular shape in an otherwise liquid system.

The first liquid phase in the form of a spherical droplet having nanoparticle surfactants assembled at the interface of the first liquid phase and the second liquid phase can subsequently be deformed. For example, by applying an external deformation field to the liquid medium, the droplet shape can be deformed and its interfacial area (surface area) can be increased to represent a new interface, thereby causing the nanoparticle surfactant assembly at the new interface to unjam, shown schematically in FIG. 1, top-right. The liquid droplet, prior to deformation, can have, for example, a diameter of 0.1 to 5 millimeters (mm), for example, 0.5 to 4 mm, for example, 1 to 2 mm. The interfacial area (surface area) can be increased by, for example, 50 to 1000%, specifically, 100 to 750%, more specifically, 200 to 600%, even more specifically, 250 to 500%. More nanoparticle surfactants can assemble at the new interface so as to saturate the new interface and maximize the reduction in interfacial energy, shown schematically in FIG. 1, bottom-right. The nanoparticle surfactants can assemble so as to saturate the said new interface and again form a disordered, jammed assembly of the nanoparticle surfactants at the said new interface.

The external deformation field can be a variety of means of deformation including, for example, mechanical means such as compressive and/or shear deformation fields, electrical deformation fields, magnetic deformation fields, ultrasonic deformation fields, or any combination thereof that can suitably change the shape of the droplet. For example, the external deformation field can be an electric field. The strength of the electric field required to achieve deformation can depend on the dielectric constants of the liquid phases, and can be selected by a skilled person accordingly. In one embodiment, an electric field having a strength of 0.1 to 10 kV/cm, specifically, 1 to 8 kV/cm, more specifically 3 to 6 kV/cm, even more specifically, 4 to 5 kV/cm. Suitably changing the shape of the droplet refers to obtaining a droplet having a non-equilibrium, non-spherical shape (i.e., an arbitrary shape). A non-equilibrium, non-spherical shape can include ellipsoid, elongated, tubular, prolate, cylindrical, toroidal, distorted, bent, and other non-spherical shapes.

Upon releasing the external deformation field, the liquid droplet having an assembly of nanoparticle surfactants at the interface attempts to relax from its deformed state so as to decrease the surface area, returning to its lowest energy (spherical) shape to minimize the interfacial area. Releasing the external deformation field occurs subsequent to the assembly of the jammed layer of nanoparticle surfactants at the new interface, and the presence of the jammed layer at the new interface can arrest further change in the shape of the liquid droplet thereby kinetically trapping the liquid droplet into a shape that can be different from its equilibrium (spherical) shape that it exhibited prior to the application of the external field, shown schematically in FIG. 1, bottom-center. Stated another way, the liquid droplet can be kinetically trapped in a deformed state by the jammed layer of nanoparticle surfactants at the new interface, wherein the deformed state has a shape that is non-spherical. Incomplete release of the external deformation field, for example, reducing the deformation field strength, or use of a second type of external deformation field in combination with the first, is also contemplated by the present invention.

The extent to which the final shape of the liquid droplet is deformed, and therefore kinetically trapped with respect to its spherical shape, can be controlled and/or influenced by various factors including, for example, the magnitude and direction of the applied external deformation field, type of applied external field(s), length of time that the external field is applied, time period for assembly of the nanoparticle surfactants at the new interface under the applied external deformation field, viscosity of the fluids, number of cycles for application and/or release of the external deformation field(s), type of nanoparticles, concentration of nanoparticles, conductivity of the fluids, dielectric permittivity of the fluids, selected end-functionalized polymer and its degree of polymerization, strength and type of the ligand interaction between the end-functionalized polymer and the nanoparticles, and combinations thereof. The extent of the assembly of the nanoparticle surfactants at the new interface, which is created by the deformation field, can be in between a fully jammed layer of nanoparticle surfactants at the new interface and a partially jammed layer of nanoparticles at the new interface. By releasing all or a portion of the external deformation field when the nanoparticle surfactant assembly is in between a fully jammed layer of nanoparticle surfactants at the new interface and a partially jammed layer of nanoparticles at the new interface, the extent of arresting further change in the shape of the drop towards its equilibrium shape that it exhibited prior to the application of the external field can be controlled, thereby providing the means to tailor the shape of the liquid droplet.

As discussed above, the nanoparticle surfactants can be decomposed in the presence of particular external stimuli, depending on the nature of the ligand type interaction. For example, when the ligand type interaction is pH dependent, for example, when the interaction comprises an ammonium-carboxylate complex, and the pH of the system is adjusted to outside a specified pH range, the stabilized assembly having a non-spherical shape can be relaxed back to its equilibrium (spherical) shape as the jammed layer of nanoparticles surfactants is released upon decomposition to the original nanoparticle and end-functionalized polymer.

The teachings of all patents, published applications and references cited herein are incorporated by reference in their entirety. All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A stabilized assembly comprising, a first liquid phase comprising non-spherical droplets dispersed in a second liquid phase, wherein the second liquid phase is immiscible with the first phase; and nanoparticle surfactants assembled at an interface of the non-spherical droplets and the second phase; wherein the nanoparticle surfactants comprise nanoparticles and end-functionalized polymers that can interact through ligand type interactions; and wherein the first liquid phase is stabilized by a disordered, jammed layer of nanoparticle surfactants.

Embodiment 2

The stabilized assembly of embodiment 1, wherein the ligand type interactions comprise high affinity or low affinity site-specific interactions, non-bonded electrostatic interactions, ionic bonds, hydrogen bonds, coordination bonds, or a combination thereof.

Embodiment 3

The stabilized assembly of embodiments 1 or 2, wherein the first phase comprises water.

Embodiment 4

The stabilized assembly of any of embodiments 1 to 3, wherein the second phase comprises an organic phase.

Embodiment 5

The stabilized assembly of any of embodiments 1 to 4, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

Embodiment 6

The stabilized assembly of any of embodiments 1 to 5, wherein the nanoparticles comprise carboxylated polystyrene.

Embodiment 7

The stabilized assembly of any of embodiments 1 to 6, wherein the end-functionalized polymer comprises an amine-functionalized polydimethylsiloxane.

Embodiment 8

The stabilized assembly of any of embodiments 1 to 7, wherein the end-functional polymer comprises a bis(amine)-functionalized polydimethylsiloxane.

Embodiment 9

The stabilized assembly of any of embodiments 1 to 8, wherein the first phase comprises water; the second phase comprises an organic phase; the nanoparticles comprise carboxylated polystyrene; and the end-functionalized polymer comprises amine-functionalized polydimethylsiloxane.

Embodiment 10

A method for preparing a stabilized assembly, the method comprising, suspending a first liquid phase in a second liquid phase, wherein the first phase and the second phase are immiscible, and wherein the first phase comprises nanoparticles; dissolving an end-functionalized polymer in the second phase, wherein the polymer and the nanoparticles can interact at an interface through ligand type interactions to form nanoparticle surfactants; applying an external deformation field; and releasing the external deformation field; wherein applying the deformation field increases the surface area of the first phase to create a new interface; wherein the nanoparticle surfactants form a disordered, jammed assembly at the new interface; wherein upon releasing the external deformation field the jammed assembly at the new interface traps the first phase in a deformed state; and wherein the deformed state has a shape that is non-spherical.

Embodiment 11

The method of embodiment 10, wherein the external deformation field comprises an electric field, a shear field, a compression field, a magnetic field, an ultrasonic field, or a combination thereof.

Embodiment 12

The method of embodiment 10 or 11, wherein the external deformation field comprises an electric field.

Embodiment 13

The method of any of embodiments 10 to 12, wherein the first phase comprises water.

Embodiment 14

The method of any of embodiments 10 to 13, wherein the second phase comprises an organic phase.

Embodiment 15

The method of any of embodiments 10 to 14, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

Embodiment 16

The method of any of embodiments 10 to 15, wherein the nanoparticles comprise carboxylated polystyrene.

Embodiment 17

The method of any of embodiments 10 to 16, wherein the end-functionalized polymer comprises an amine-functionalized polydimethylsiloxane.

Embodiment 18

The method of any of embodiments 10 to 17, wherein the end-functional polymer comprises a bis(amine)-functionalized polydimethylsiloxane.

Embodiment 19

The method of any of embodiments 10 to 18, wherein the first phase comprises water; the second phase comprises an organic phase; the nanoparticles comprise carboxylated polystyrene; the end-functionalized polymer comprises amine-functionalized polydimethylsiloxane; and the external deformation field is an electric field.

Embodiment 20

The method of any of embodiments 10 to 19, further comprising the steps of reapplying the external deformation field to unjam the nanoparticle surfactant assembly and further increase the surface area of the first phase to create a second new interface; releasing the external deformation field; and optionally, repeating the steps of reapplying and releasing the deformation field one or more times; wherein the nanoparticle surfactants form a disordered, jammed assembly at the second new interface; and wherein upon releasing the external deformation field, the jammed assembly at the second new interface traps the first phase in a second deformed state that is the same or different as the deformed state prior to reapplying the deformation field, and is non-spherical.

The invention is further illustrated by the following non-limiting Examples.

EXAMPLES

A stabilized assembly having a non-spherical shape was prepared according to the scheme of FIG. 1. An aqueous dispersion of carboxylated polystyrene nanoparticles was placed in a mixture of oils, consisting of 95 volume percent of a higher viscosity ($\eta$=60,000 centistokes (cSt)) silicone oil and 5 volume percent of a lower viscosity silicone oil ($\eta$=50 cSt) with an amine end-group (an amine-functionalized polydimethylsiloxane (PDMS)). Nanoparticle surfactants formed as a result of carboxylate-amine interactions, and were assembled at the oil-water interface, thereby reducing the interfacial energy. The nanoparticle surfactants facilitate the formation of spherical water droplets dispersed in the continuous oil phase. The number of PDMS polymer chains interacting with each nanoparticle is limited by the minimum in the energy, balancing the solubilization of the surfactant in each fluid and the reduction in the interfacial energy. Consequently, the system is self-regulating.

Figure 2:
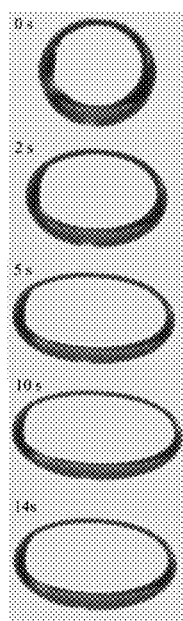
FIG. 2 shows a time series showing the deformation of a water drop, containing a 1 weight percent dispersion of 15 nanometer (nm) carboxylated polystyrene nanoparticles, suspended in a silicone oil containing polydimethylsiloxane, end-functionalized with an amine, under a 4.6 kilovolt per centimeter (kV/cm) electric field. The diameter of the original drop is 1.8 millimeters (mm).

An electric field (4.6 kV/cm) was applied to the dispersion, and the spherical water droplets were stretched into prolate ellipsoids under the influence of the electric field, as shown in FIG. 2. The surface area of the water droplet increased from 40.72 to 193.21 mm$^2$, representing a 375% increase in surface area. Over time, the droplet was observed to stretch further, thereby increasing the major axis of the ellipsoid and decreasing the minor axis, up to a point where the increase in surface area, i.e. interfacial energy, balances the applied force of the electric field.

Figure 4:
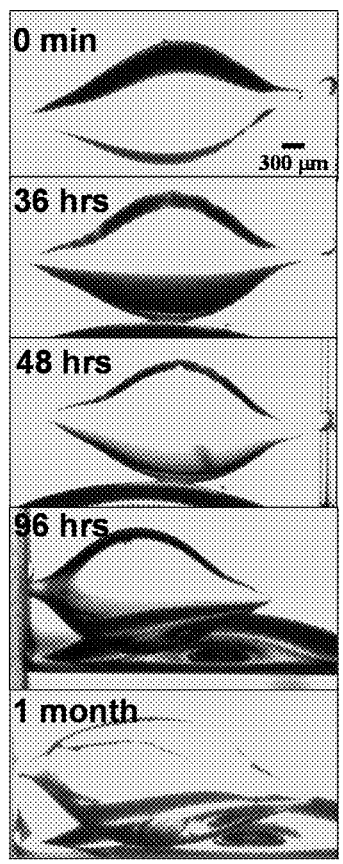
FIG. 4 shows a time series of a drop, clad with nanoparticle surfactants, that has been deformed in an electric field and the field has been shut off.

When the electric field was removed (i.e., shut off), the deformation of the drop decreased slightly, to a surface area of 189.0 mm$^2$, at which point the nanoparticle surfactants were jammed at the interface, arresting further relaxation, and kinetically trapping the drop in a non-equilibrium, non-spherical shape. FIG. 4 demonstrates the exceptional stability of the deformed water droplet after removal of the electric field, where after one month the droplet retained the highly deformed shape. Any shape changes that occurred are attributable to solvent evaporation. If the volume of the droplet was decreased, for example by solvent evaporation, the jammed nanoparticle surfactant assembly was observed to wrinkle and buckle, depending on the amount of volume loss, demonstrating the rigid nature of the disordered, jammed nanoparticle surfactant layer. If the volume of the droplet was maintained, no wrinkling or buckling occurred.

The deformation (D) of the spherical droplet was related to the strength of the applied electric field (E) using the leaky dielectric model introduced by Taylor et al. See, e.g., G. Taylor, *Proc. R. SOC. Lond A,* 280, 383 (1964); O. Vizika, D. A. Saville, J. Fluid Mech., 239, 1 (1992); D. A. Saville, *Annu. Rev. Fluid Mech.,* 29, 27 (1997). The deformation is related to the strength of the applied electric field according to formulas (1) and (2)

$$D = \frac{9\varepsilon_0 \varepsilon_d \Phi a E^2}{16\gamma(2+R)^2} \quad (1)$$

$$\Phi \equiv S(R^2+1) - 2 + 3(SR-1)\frac{2M+3}{5M+5} \qquad (2)$$

where $D=(d_1-d_2)/(d_1+d_2)$ with $d_1$ and $d_2$ being the major and minor axes of the ellipsoid formed, $\alpha$ is the radius of the initial drop, $\gamma$=interfacial tension, $\in_0$=permittivity of free space, and $\in_d$=permittivity of the liquid inside the drop. S is the ratio of the dielectric permittivities of the drop to the surrounding liquid, R is the ratio of the respective conductivities, and M is the ratio of the respective viscosities. Since the conductivity of water is much larger than that of silicone oil, $R\sim 10^6$, to a very good approximation, $$D \approx \frac{aE^2}{\gamma} \qquad (3)$$

and the deformation of the droplet should vary linearly with $E^2$ and have a slope of $\alpha/\gamma$. If the droplet is highly conductive (as is the case of the present examples), the electrostatic pressure acting on the interface to deform the drop is countered by energetic gain arising from the increased interfacial area. See, e.g., H. A. Stone, J. R. Lister, M. P. Brenner, *Proc. R. Soc. Lond. A*, 455, 329 (1999); J. W. Ha, S. M. Yang, *J. Fluid Mech.*, 405, 131 (2000); J. Q. Feng, T. C. Scott, *J. Fluid Mech.*, 311, 289 (1996). Thus, the deformation of the droplet can also be explained by a balance of electric and mechanical forces, yielding the same result. In the limit of small deformation, as shown in FIG. 3, the interfacial tension can be determined.

Figure 3:
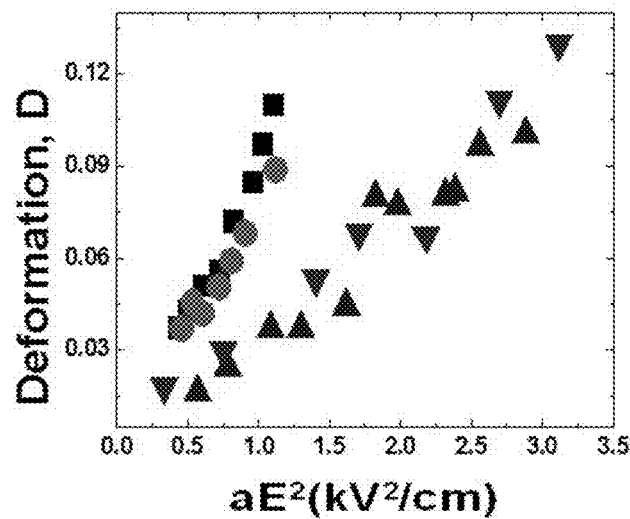
FIG. 3 shows the linear relationship between the deformation (D) and the applied electric field ($aE^2$) under various conditions. The inverted triangles represent pure water in pure, nonfunctional silicone oil; the triangles are results from polystyrene nanoparticles in water dispersed in a nonfunctional silicone oil; the circles represent pure water in mixed silicone oils, one of which is an amine end-functionalized polydimethylsiloxane (5%); the squares are results for a drop of an aqueous dispersion of carboxylated polystyrene nanoparticles (1%) in mixed silicone oils, one of which is an amine end-functionalized polydimethylsiloxane (5%).

As shown in FIG. 3, the deformation of a droplet having only pure water and a droplet having polystyrene nanoparticles dispersed in the water have identical deformations. When PDMS was incorporated into the oil phase, the rate at which a droplet having only pure water exhibited a deformation (D) change with $E^2$ that was 2.1 times greater than when the PDMS was not included. This result indicates that the functionalized PDMS behaves as a surfactant and decreases the interfacial tension ($\gamma$). However, in this case when the electric field was removed, the drop returned to its equilibrium spherical shape. When both the polystyrene nanoparticles and the functionalized PDMS are included in the water and oil phases, respectively, the rate at which D increased with $E^2$ was 2.6 times greater than that of the system incorporating the pure liquid phases. This indicates a further reduction in interfacial tension ($\gamma$) due to the formation of nanoparticle surfactants through the association of the carboxylate and amino functionalities on the polystyrene and PDMS, respectively.

With the assumption that the conductivity, viscosity and permittivity ratios are constant, interfacial tension ($\gamma$) values were determined, since $\gamma$ between water and silicone oil is 25 millinewton per meter (mN/m). Interfacial tension for pure water with the silicone oil mixture containing amino end-capped silicone oil (amine-functionalized PDMS) is 12.14 mN/m and interfacial tension for water with carboxylated polystyrene nanoparticles in the silicone oil mixture containing amino end-capped silicone oil was 9.58 mN/m. Similar results were also found for a system having water as the dispersed phase and toluene as the continuous oil phase. These results provide insight into the mechanism of the formation of the nanoparticle surfactants. It is apparent that the nanoparticles alone do not show any strong interfacial activity, whereas the amine end-capped silicone oil does.

Thus, without wishing to be bound by theory, it is reasonable to conclude that the end-capped silicone oil (amine-functionalized PDMS) initially assembles at the interface and the carboxylated polystyrene nanoparticle then diffuses to the interface, facilitating an interaction with the amine end-groups on the silicone oil, forming the nanoparticle surfactants. The same results were found when oil droplets were dispersed in an aqueous dispersion of the nanoparticles.

Multiple jamming and unjamming steps, where the direction of the applied field can be the same or different in subsequent steps, can produce unusual shapes that are stable for extended periods of time, for example, at least one month. The unjamming of the nanoparticle surfactant assemblies opens opportunities to control the shape of the fluid drops and stabilize highly non-equilibrium drop shapes. The nanoparticle surfactant assembly does not show cracking when the drop is deformed which is indicative of its jammed state, as opposed to being glassy or ordered. A water droplet containing carboxylated polystyrene nanoparticles in a continuous oil phase containing amine end-capped PDMS was sequentially subjected to electric fields in orthogonal directions. Applying the field in the x-direction deformed the droplet into an ellipsoid with the major axis in the direction of the applied field. Re-application of the electric field further deformed the droplet in the x-direction, yielding tubular structures extending from the droplet. An electric field was then applied in a direction orthogonal to the previously applied electric field, for example, in the y-direction, which resulted in a further deformation of the droplet, producing a similar type of tubular structure in the y-direction. A liquid droplet was further treated with application of another electric field along the y-direction, leaving an elongated "fish-shaped" droplet that remained stable for at least one month, at which point the experiment was terminated. These results demonstrate that the unjamming of the nanoparticle surfactant assembly initially occurs locally, enabling independent deformation in different directions, and the formation of shaped droplets that are far removed from their equilibrium spherical shape, for example, tubular shapes.

Other types of external deformation fields can be used to deform the droplets, for example application of a shear deformation field. In this example, a stirring rod was placed in a drop of the aqueous dispersion containing carboxylated polystyrene nanoparticles, suspended in a silicone oil phase comprising the amine-functionalized PDMS. The rod was dragged through the oil, resulting in an aqueous tube having nanoparticle surfactants assembled at the oil-water interface. The tubular structures had an average diameter of less than or equal to 1 mm. When this system was subsequently stirred, the aqueous tubes stabilized by the jammed nanoparticle surfactants maintained the original diameter of less than or equal to 1 mm, and were noted to be exceptionally long. Thus, simply by stirring, a bicontinuous jammed system, a "bijel"-type of morphology, can be achieved, without modifying and tuning the surface chemistry of the nanoparticle to achieve neutral wetting. The carboxylate-amine interactions between the nanoparticles and functionalized silicone oil are self-regulating, maximizing the reduction in the interfacial energy, overcoming thermal energies and stabilizing the nanoparticle surfactants at the interface to give highly stable jammed liquid-liquid assemblies.

In another example, the mono-functional PDMS was replaced with a di-functional PDMS, that is, a PDMS having a primary amine at both chain ends (e.g., a bis(amine)-functionalized PDMS. In this example, the jammed nanoparticle surfactant assemblies could be further stabilized, as the di-functional PDMS chains can bridge adjacent nanoparticles, effectively crosslinking the jammed nanoparticle surfactant assembly. A water droplet having carboxylated polystyrene nanoparticles was suspended in silicone oil containing the di-functional PDMS. The water droplet was contacted with the silicone oil for 2 minutes. A 4.6 kV/cm electric field was applied, and the droplet did not deform. Without wishing to be bound by theory, it is believed that the relatively long contact time of 2 minutes allowed for a high quantity of nanoparticle surfactants to form at the interface, with the nanoparticle surfactants having a high degree of crosslinking due to the presence of the di-functional PDMS, thus preventing deformation of the droplet. The experiment was also done on a water droplet which was allowed to contact the oil phase for 30 seconds prior to application of the same electric field. This water droplet was observed to deform in the presence of the electric field, due to the shorter contact time and corresponding lower degree of crosslinking. These experiments demonstrate the further stabilization of droplets that have been effectively crosslinked using a di-functional polymer in the preparation of the nanoparticle surfactants.

Experimental details follow.

Materials.

Carboxylate-functionalized polystyrene nanoparticles having a 15 nanometer diameter were obtained from Microspheres-Nanospheres. High viscosity silicone oil (60,000 centistokes (cSt)) was obtained from Sigma Aldrich. Low viscosity silicone oil (50 cSt) having an amine end-group (amine-functionalized polydimethylsiloxane) was obtained from Polymer Source. Low viscosity silicone oil (50 cSt) having an amine end-group bis(amine)-functionalized polydimethylsiloxane at both chain ends was obtained from Sigma Aldrich.

Stabilized assemblies having a non-spherical shape were prepared as summarized in the scheme of FIG. 1.

Carboxylate-functionalized polystyrene nanoparticles were dispersed in water at a concentration of 10 milligrams per milliliter (1 weight percent). The aqueous dispersion of nanoparticles (1-2 milliliters) was added to 10 milliliters of a mixture of oil consisting of 95 volume percent of a high viscosity silicone oil and 5 volume percent of a low viscosity silicone oil having an amine end-group (an amine-functionalized polydimethylsiloxane (PDMS)). The oil-water mixture was stirred with a stir rod for one hour, then kept for 12 hours at room temperature prior to use. Nanoparticle surfactants formed as a result of the carboxylate-amine interactions between the polystyrene nanoparticles and the PDMS, and were assembled at the oil-water interface, reducing the interfacial energy.

An electric field (4.6 kV/cm) was applied using a high voltage power supply capable of providing a voltage up to 30 kilovolts (kV) between two parallel, flat electrodes. The distance between the electrodes was 1.5 centimeters (cm). Droplet deformation was imaged using a camera and ImageJ software. The spherical water droplet, having a diameter of 1.8 millimeters, was observed to stretch to an ellipsoid overt time, as shown in FIG. 2. The surface area was increased from 40.7 to 193.3 mm$^2$. The electric field was removed after 14 seconds and the surface area of the droplet was reduced to 189.0 mm$^2$. The nanoparticle surfactants jammed at the droplet interface, arrested further relaxation, and kinetically trapped the droplet in a non-equilibrium, non-spherical shape. The deformed droplets were observed to be stable for up to 1 month after removal of the electric field, as shown in FIG. 3.

While this invention has been particularly shown and described with references to exemplary embodiments thereof, it will be understood by those skilled in the art that various changes in form and details may be made therein without departing from the scope of the invention.

The invention claimed is:

1. A stabilized assembly comprising,
 a first liquid phase comprising non-spherical droplets dispersed in a second liquid phase, wherein the second liquid phase is immiscible with the first phase; and
 nanoparticle surfactants assembled at an interface of the non-spherical droplets and the second phase;
 wherein the nanoparticle surfactants comprise nanoparticles and end-functionalized polymers that can interact through ligand interactions; and
 wherein the first liquid phase is stabilized by a disordered, jammed layer of nanoparticle surfactants.

2. The stabilized assembly of claim 1, wherein the ligand interactions comprise high affinity or low affinity site-specific interactions, non-bonded electrostatic interactions, ionic bonds, hydrogen bonds, coordination bonds, or a combination thereof.

3. The stabilized assembly of claim 1, wherein the first phase comprises water.

4. The stabilized assembly of claim 1, wherein the second phase comprises an organic phase.

5. The stabilized assembly of claim 1, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

6. The stabilized assembly of claim 1, wherein the nanoparticles comprise carboxylated polystyrene.

7. The stabilized assembly of claim 1, wherein the end-functionalized polymer comprises an amine-functionalized polydimethylsiloxane.

8. The stabilized assembly of claim 1, wherein the end-functional polymer comprises a bis(amine)-functionalized polydimethylsiloxane.

9. The stabilized assembly of claim 1, wherein
 the first phase comprises water;
 the second phase comprises an organic phase;
 the nanoparticles comprise carboxylated polystyrene; and
 the end-functionalized polymer comprises amine-functionalized polydimethylsiloxane.

10. A method for preparing a stabilized assembly, the method comprising,
 suspending a first liquid phase in a second liquid phase, wherein the first phase and the second phase are immiscible, and wherein the first phase comprises nanoparticles;
 dissolving an end-functionalized polymer in the second phase, wherein the polymer and the nanoparticles can interact at an interface through ligand interactions to form nanoparticle surfactants;
 applying an external deformation field; and
 releasing the external deformation field;
 wherein applying the deformation field increases the surface area of the first phase to create a new interface;
 wherein the nanoparticle surfactants form a disordered, jammed assembly at the new interface;
 wherein upon releasing the external deformation field the jammed assembly at the new interface traps the first phase in a deformed state; and
 wherein the deformed state has a shape that is non-spherical.

11. The method of claim 10, wherein the external deformation field comprises an electric field, a shear field, a compression field, a magnetic field, an ultrasonic field, or a combination thereof.

12. The method of claim 10, wherein the external deformation field comprises an electric field.

13. The method of claim 10, wherein the first phase comprises water.

14. The method of claim 10, wherein the second phase comprises an organic phase.

15. The method of claim 10, wherein the nanoparticles are metal, metal oxide, dielectric, semiconducting, inorganic, organic, hybrid structures, or a combination thereof, and wherein the nanoparticles have one or more dimensions of less than or equal to 100 nanometers.

16. The method of claim 10, wherein the nanoparticles comprise carboxylated polystyrene.

17. The method of claim 10, wherein the end-functionalized polymer comprises an amine-functionalized polydimethylsiloxane.

18. The method of claim 10, wherein the end-functional polymer comprises a bis(amine)-functionalized polydimethylsiloxane.

19. The method of claim 10, wherein
the first phase comprises water;
the second phase comprises an organic phase;
the nanoparticles comprise carboxylated polystyrene;
the end-functionalized polymer comprises amine-functionalized polydimethylsiloxane; and
the external deformation field is an electric field.

20. The method of claim 10, further comprising the steps of
reapplying the external deformation field to unjam the nanoparticle surfactant assembly and further increase the surface area of the first phase to create a second new interface;
releasing the external deformation field; and
optionally, repeating the steps of reapplying and releasing the deformation field one or more times;
wherein the nanoparticle surfactants form a disordered, jammed assembly at the second new interface; and
wherein upon releasing the external deformation field, the jammed assembly at the second new interface traps the first phase in a second deformed state that is the same or different as the deformed state prior to reapplying the deformation field, and is non-spherical.

* * * * *